US007435475B2

(12) United States Patent
Heilman et al.

(10) Patent No.: US 7,435,475 B2
(45) Date of Patent: Oct. 14, 2008

(54) LUXURY FIBER BLEND FOR USE IN FIBERFILL HOUSEHOLD TEXTILE ARTICLES

(75) Inventors: Robert D. Heilman, Buffalo, NY (US); Jeffrey R. Kumm, Amherst, NY (US)

(73) Assignee: L&P Property Management Company, South Gate, CA (US)

( * ) Notice: Subject to any disclaimer, the term of this patent is extended or adjusted under 35 U.S.C. 154(b) by 434 days.

(21) Appl. No.: 10/899,598

(22) Filed: Jul. 27, 2004

(65) Prior Publication Data

US 2006/0024470 A1 Feb. 2, 2006

(51) Int. Cl.

| | |
|---|---|
| ***D02G 3/00*** | (2006.01) |
| ***B32B 25/10*** | (2006.01) |
| ***D04H 1/46*** | (2006.01) |
| ***D04H 1/54*** | (2006.01) |

(52) U.S. Cl. ....................... 428/359; 428/364; 428/365; 428/296.7; 442/403; 442/411

(58) Field of Classification Search ................. 428/359, 428/364, 365, 296.7; 442/357, 365, 403, 442/411

See application file for complete search history.

(56) References Cited

U.S. PATENT DOCUMENTS

| | | | | |
|---|---|---|---|---|
| 3,151,439 | A * | 10/1964 | Dusenbury | 57/286 |
| 4,400,426 | A * | 8/1983 | Aldrich | 442/60 |
| 4,820,574 | A | 4/1989 | Tesch | 428/234 |
| 5,038,447 | A | 8/1991 | Schmidt et al. | 28/112 |
| 5,217,780 | A | 6/1993 | Wurzer | 428/74 |
| 5,329,868 | A | 7/1994 | Tesch | 112/262.1 |
| 5,408,712 | A * | 4/1995 | Brun | 5/502 |
| 6,026,330 | A | 2/2000 | Chuang | 607/100 |
| 2003/0118785 | A1* | 6/2003 | Aneja | 428/182 |

FOREIGN PATENT DOCUMENTS

| | | | |
|---|---|---|---|
| CN | 1073224 | A | 6/1993 |
| CN | 1080968 | A | 1/1994 |
| EP | 0 340 758 | | 11/1989 |
| JP | 3021267 | A2 | 1/1991 |
| JP | 3070513 | A2 | 3/1991 |
| JP | 4024236 | A2 | 1/1992 |
| JP | 11103905 | A2 | 4/1999 |
| JP | 11247039 | A2 | 9/1999 |

(Continued)

OTHER PUBLICATIONS

"Batting Project Results," www.LongarmChat.com, 25 pgs.

(Continued)

*Primary Examiner*—Lynda Salvatore
(74) *Attorney, Agent, or Firm*—Conley Rose, P.C.; Kristin Jordan Harkins

(57) ABSTRACT

A pillow, pillow form, quilt or other household textile article is comprised of a ticking having a fiberfill inserted into an interior space thereof. The fiberfill is comprised of a luxury fiber blend in the form of either loose fibers or a nonwoven fiber batt. The luxury fiber blend is comprised of a first amount, preferably, five percent by weight, of a luxury fiber such as silk or cashmere and a second amount, preferably ninety-five percent by weight, of a non-luxury fiber such as polyester.

10 Claims, 3 Drawing Sheets

FOREIGN PATENT DOCUMENTS

| | | | |
|---|---|---|---|
| JP | 2003239174 | A2 | 8/2003 |
| WO | WO 99/16705 | | 4/1999 |

OTHER PUBLICATIONS http://print.google.com/print/doc?articleid=F4Z2TuorHU8, *DuPont, Louisville Bedding Step Up with New Pillow Fill*, Home Textiles Today, Oct. 7, 2002, 1 pg.

http://www.ldinteriortextiles.com/pdf/july__2003/print/innovate.cfm, *Inovate! Inovate!*, LDB Interior Textiles, Jul. 2003, 7 pgs.

http://www.ldinteriortextiles.com/pdf/july__2002/looking.cfm, *Looking Up from the Floor*, LDB Interior Textiles, Jul. 2002, 11 pgs.

http://www.invista.com/prd__comforel.shtml, COMFOREL®, *Comfortable Sleep Products*, Invista, date unknown, 1 pg.

http://www.bedbathandbeyond.com/product.asp?order__num=-1&MC=1&SKU=103128, *Stateroom Pillows by Nautica, 310 Thread Count*, date unknown, 1 pg.

http://www.designerlinensoutlet.com/store/product1.asp?SID=1&Product__ID=100864&mcode=tl, *Designer Linens at Discount Prices*, Designer Linens Outlet, date unknown, 3 pgs.

Pillowfill Sample, Nautica Microsilk Pillow, purchase date Aug. 31, 2004.

* cited by examiner

LUXURY FIBER BLEND FOR USE IN FIBERFILL HOUSEHOLD TEXTILE ARTICLES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

The present invention relates to a luxury fiber blend for use in fiberfill household textile articles, in particular, fiberfill pillow inserts for use with home furnishings and the like and beddings such as pillows, comforters, quilts, bedspreads, pads and other textile fiber products used or intended to be used on or about a bed or other place or other place for reclining or sleeping. The invention further relates to tickings and other types of casings, filled with a homogenous blend of plural types of fibers which includes at least one type of luxury fiber, to produce fiberfill beddings and other fiberfill household textile articles.

A number of household textile articles are generally characterized as fiberfill household textile articles. Broadly speaking, a fiberfill household textile article is comprised of a ticking or other type of casing filled with manufactured fibers, most commonly, polyester fibers, specially engineered for use as filling material. A common fiberfill household textile article is the pillow. Ordinarily, consumers use pillows in conjunction with a mattress. While consumers generally prefer that a mattress be characterized by suitably high levels of supportability, durability and rigidity, like many household textile articles used as beddings, consumers are typically more concerned that pillows have suitably high levels of comfort and loft.

Because of the aforementioned consumer preferences, loose fibers, non-woven fiber batts, and foams have traditionally been selected as the fiberfill to be used for pillows. Regardless of which type of fiberfill is used, the selected fiberfill is manufactured to be soft and comfortable to the touch. Other characteristics of the selected fiberfill, e.g., supportability, durability and rigidity, are of less importance to the manufacturer. More specifically, supportability is relatively unimportant because pillows rarely support heavy weights, durability because pillows are less expensive and easier to replace in comparison to mattresses or other types of bedding and rigidity because it is generally preferred that pillows conform to the head when used for sleeping.

Pillows are also used in other settings outside of the bedroom. For example, pillows or cushions are often used to add comfort to and/or enhance the appearance of sofas, chairs and other articles of furniture. For such uses, an intermediate product commonly known as a pillow insert is first constructed. Generally, a pillow insert is comprised of a ticking, preferably, a plain white ticking constructed of cloth or another inexpensive material, in which fiberfill, typically, in the form of either loose fiberfill or a nonwoven fiber batt, is inserted. Before being used with a sofa, chair or other article of furniture, assembly of the pillow must first be completed by inserting the plain white pillow insert into a second, decorative, ticking. While any numbers of terms are used to identify this particular type of pillow and the pillow inserts from which this type of pillow is formed, a common identifying term is a “throw pillow.” Furthermore, while throw pillows may be constructed in any number of shapes and/or dimensions, square throw pillows which are either 14, 16 or 18 inches along each side are quite common.

The throw pillow is now ready to add comfort to and/or enhance the appearance of a sofa, chair or other article of furniture, for example, by positioning the throw pillow such that it functions as a side rest for a person sitting or reclining on the sofa, chair or other article of furniture. When used to add comfort to and/or enhance the appearance of a sofa, chair or other article of furniture, the characteristics of the throw pillow that consumers are more interested in are softness and comfort. Other characteristics, for example, supportability, durability and rigidity are less important. For example, the throw pillow is rarely asked to bear more than a moderate amount of weight. Accordingly, support is rarely of concern. Like others, the throw pillow is easily replaced, thereby reducing the need for durability. Finally, as throw pillows are often expected to conform somewhat to the shape of the sofa, chair or other article of furniture, it is typically preferred that throw pillows have only a limited amount of rigidity.

Another common fiberfill household textile article is the quilt. Traditionally, the fiberfill used for quilts has been comprised of loose fibers or nonwoven fiber batts. When nonwoven fiber batts are used as the fiberfill for quilts, a center section of the quilt will typically contain a plurality of tack points which keep a top side of the quilt joined to a bottom side thereof. Variously, the tack points may be hand or machine stitched. As a result, the nonwoven fiber batt must be of sufficient thickness and density to allow for either type of stitching. In order to be suitable for use as the fiberfill of a quilt, the nonwoven fiber batt must also be characterized as soft and comfortable to the touch, drapeable, supple, and have a soft hand. Because quilts are not designed to support any weight, support is a relatively unimportant characteristic. Likewise, because quilts are typically well cared for and easily replaced, durability is also a relatively unimportant characteristic. Finally, because a quilt is intended to be drapeable, e.g., conform to the body of the person under the quilt, rigidity is also a relatively unimportant characteristic. Even when the quilt is used for decorative purposes, such as when the quilt is draped over a chair or sofa, rigidity is oftentimes seen as an undesirable characteristic.

The Textile Fiber Products Identification Act (15 U.S.C. § 70 et seq.) governs the labeling of textile fiber products. Under this Act, textile fiber products must include a stamp, tag, label, or other means of identification, affixed to the product, which states: (1) the constituent fiber or combination of fibers in the textile fiber product in the order of predominance by the weight thereof if the weight of such fiber is 5 percent or more of the total fiber weight of the product; (2) the percentage of each such fiber present, by weight, in the total fiber content of the textile fiber product; (3) the name of the manufacturer of the product; and (4) the country where the textile fiber product was processed and/or manufactured. Unless a fiber has a clearly established functional significance, fibers constituting less than 5 percent of the total weight of the textile fiber product may only be identified as “Other Fibers.” For example, the Act will allow a textile fiber product to be marked “3 percent by weight Spandex for elasticity.”

Synthetic fibers, such as polyester, provide superior levels of loft and softness. As a result, these fibers have typically been used as fiberfill for household textile articles. However, as a whole, the public perceives polyester and other synthetic fibers as relatively ordinary. As a result, regardless of the level of loft and softness provided thereby, household textile articles filled with such fibers are perceived as being of ordinary quality. In contrast, a number of fibers, for example, silk and cashmere, are perceived by the public as luxurious fibers. As a result, household textile articles filled with these so-called "luxury" fibers are perceived to be of superior quality relative to household textile articles filled with polyester or other "ordinary" fibers. Like polyester fibers, luxury fibers such as silk and cashmere provide superior levels of loft and softness. However, the level of loft and softness provided by a luxury fiber such as silk or cashmere is not necessarily as superior, relative to the level of loft and softness provided by an ordinary fiber such as polyester, as the consumer's general perception of the luxury fiber as a superior fiber relative to the ordinary fiber. Furthermore, the cost of constructing fiberfill out of silk, cashmere or another luxury fiber is quite expensive. As a result, a pillow, quilt or other fiberfill household textile article filled with silk, cashmere or another luxury fiber would, for many consumers, be cost prohibitive. As a result, in spite of a perception of the product as being of lesser quality, such consumers would more likely purchase a pillow, quilt or other fiberfill household textile article filled with polyester or other ordinary fiber.

In spite of the high costs associated therewith, consumer studies indicate that there is a large demand for fiberfill household textile articles such as pillows and quilts containing luxury fibers. In part, this demand results from the desire of consumers to possess heirlooms-treasured possessions which may be handed down from generation to generation—of great value. However, because of the absence of an inexpensive luxury fiber-containing fiberfill, luxury fiberfill household textile articles remain expensive. It should be readily appreciated, however, that there remains a need for pillows, quilts and other luxury fiberfill household textile articles that are not cost prohibitive for consumers.

BRIEF DESCRIPTION OF THE DRAWINGS

For a more complete understanding of the present invention, and for further details and advantages thereof, reference is now made to the following Detailed Description taken in conjunction with the accompanying drawings, in which.

SUMMARY OF THE INVENTION

Figure 1:
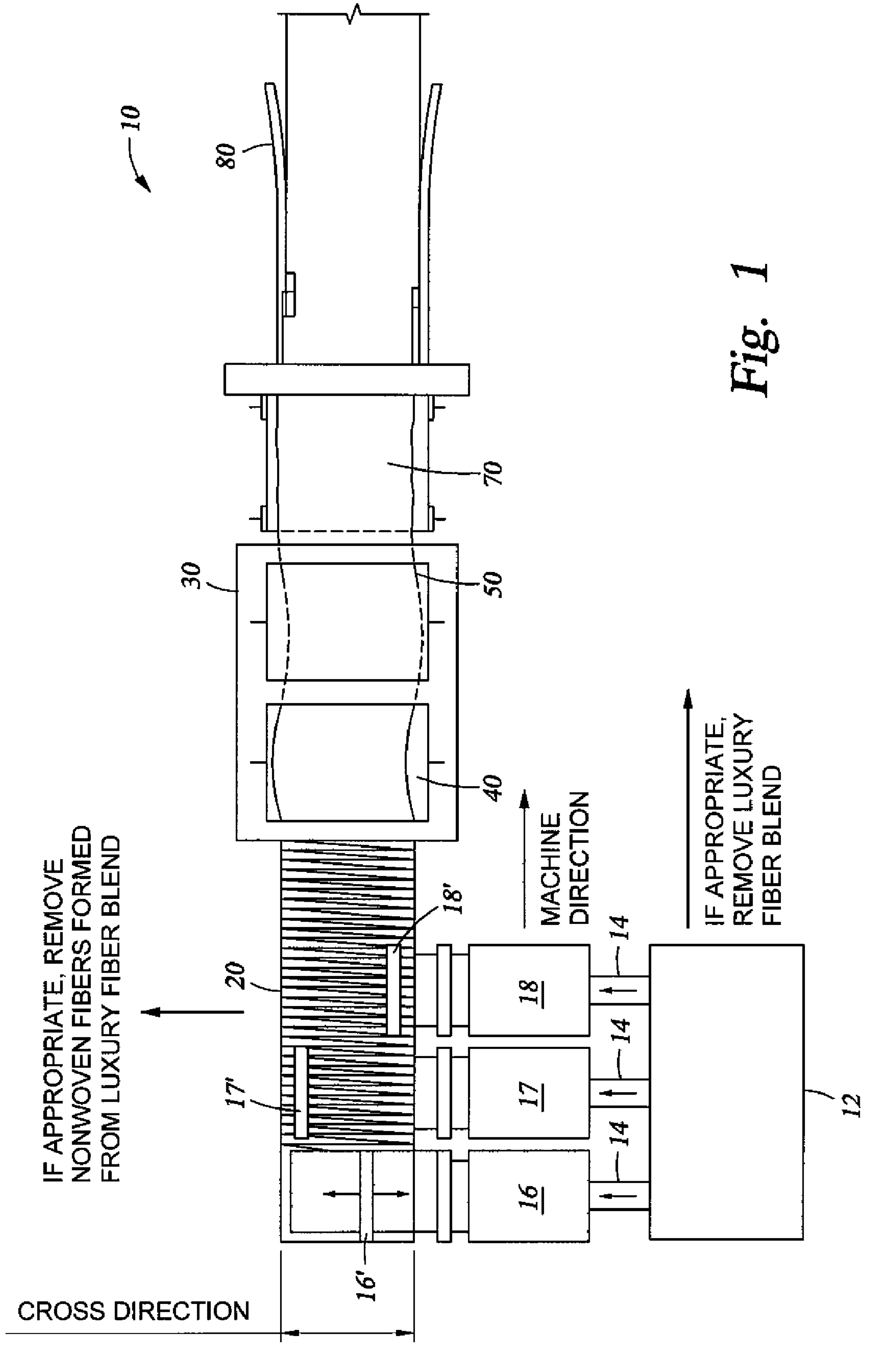
FIG. 1 is a top plan view of the processing line for forming luxury fiber blends, webs and/or batts used as fiberfill for luxury household textile articles.

In one embodiment, the present invention is directed to a fiber blend for use in fiberfill household textile articles. The fiber blend is comprised of a first amount, by weight, of a first type of fiber and a second amount, by weight, of a second type of fiber, the second type of fiber being a staple fiber. The amount, by weight, of the first type of fiber is about two percent of the fiber blend and the amount, by weight, of the second type of fiber is equal to or greater than the amount, by weight, of the first type of fiber. Each type of fiber has a respective cost per unit weight and the cost per unit weight of the second type of fiber is substantially less than the cost per unit weight of the first type of fiber.

In one aspect thereof, the amount of the first type of fiber is at least about five percent, by weight, of the fiber blend. In another, the amount of the second type of fiber is about ninety-five percent, by weight, of the fiber blend. In one of various further aspects of this embodiment and aspects thereof, the first type of fiber is a luxury fiber and the second type of fiber is a non-luxury fiber. In another, the first type of fiber is silk and the second type of fiber is polyester while, in still another, the first type of fiber is cashmere and the second type of fiber is polyester.

In another embodiment, the present invention is directed to a first luxury fiber blend for use in fiberfill household textile articles. The luxury fiber blend is comprised of a first amount, by weight, of a luxury fiber and a second amount, by weight, of a non-luxury fiber, the second type of fiber being a staple fiber. The first amount is at least about five percent, by weight, of the luxury fiber blend and the second amount is greater than the first amount. In one aspect thereof, the second amount is about ninety-five percent, by weight, of the luxury fiber blend. In one of various further aspects of this embodiment and aspect thereof, the luxury fiber is silk and the non-luxury fiber is polyester. In another, the luxury fiber is cashmere and the non-luxury fiber is polyester. In still another, the luxury fiber is animal hair while, in still yet another, the luxury fiber is comprised of one or more types of luxury fibers selected from the group consisting of silk, cashmere, wool, alpaca, merino, pashmina, cashgora, mohair, camel, and angora.

In still another embodiment, the present invention is directed to a second luxury fiber blend for use in fiberfill household textile articles. The luxury fiber blend is comprised of a first amount, by weight, of a luxury fiber and a second amount, by weight, of a non-luxury fiber, the non-luxury fiber being a staple fiber. The first amount is at least two percent, by weight, of the luxury fiber blend and the second amount, is greater than the first amount. In one aspect of this embodiment, the amount of the luxury fiber is between about two percent and about eight percent, by weight, of the luxury fiber blend. In another, the amount of the luxury and non-luxury fibers are between about two percent and about eight percent and between about ninety-two percent and about ninety-eight percent, respectively, of the luxury fiber blend. In still another aspect of this embodiment, the amount of the luxury fiber is between about five percent and about fifteen percent, by weight, of the luxury fiber blend. Variously, the luxury fiber may be silk or cashmere.

In still yet another aspect of this embodiment of the invention, the amount of the luxury and non-luxury fibers are between about five percent and about fifteen percent and between about eighty-five percent and about ninety-five percent, respectively, of the luxury fiber blend. In still another, the amount of the luxury fiber is between about two percent and about eight percent, by weight, of the luxury fiber blend while, in still yet another, the amount of the luxury and non-luxury fibers are between about two percent and about eight percent and between about ninety-two percent and about ninety-eight percent, respectively, of the luxury fiber blend.

In still another aspect of this embodiment of the invention, the amount of the luxury fiber is between about five percent and about twenty-five percent, by weight, of the luxury fiber blend. In further accordance with this aspect, the luxury fiber is wool. In still yet another aspect of this embodiment of the invention, the amount of the luxury fiber is between about seventy-five percent and about ninety-five percent, by weight, of the luxury fiber blend. In still another, the amount of the luxury fiber is between about two percent and about twenty-eight percent, by weight, of the luxury fiber blend. Finally, in still another, the amount of the luxury fiber is between about two percent and about twenty-eight percent and the amount of the non-luxury fiber is between about seventy-two percent and about ninety-eight percent, respectively, of the luxury fiber blend.

In another embodiment, the present invention is directed to a household textile article comprised of a ticking having a fiberfill within an interior space thereof. The fiberfill is comprised of a first amount of luxury fibers and a second amount of non-luxury fibers, the non-luxury fibers being staple fibers. In accordance with this embodiment, the luxury fibers comprise at least about five percent, by weight, of the fiberfill and the second amount of non-luxury fibers is greater than said first amount. Variously, the fiberfill may be comprised of loose fibers or a nonwoven fiber batt. Variously again, the luxury fibers contained in the fiberfill may be silk, cashmere, wool, alpaca, merino, pashmina, cashgora, mohair, camel or angora while the non-luxury fibers contained in the fiberfill may be polyester. In one aspect thereof, the luxury fiber blend may also include a low melt binder fiber. In other aspects thereof, the luxury fiber is about five percent, by weight, of the fiberfill while the non-luxury fiber is about ninety-five percent, by weight of the fiberfill. In still further aspects thereof, the household textile article is a pillow, a pillow form or a quilt.

In still another embodiment, the present invention is directed to a household textile article comprised of a ticking having a fibefill within an interior space thereof. The fiberfill is comprised of a first amount, by weight, of luxury fibers and a second amount, by weight, of non-luxury fibers, the non-luxury fibers being staple fibers. In accordance with this embodiment, the fiberfill is comprised of at least two percent, by weight, of luxury fibers and a greater percentage, by weight, of non-luxury fibers. In various aspects thereof, the composition of the fiberfill may range between the aforementioned about two percent, by weight, of luxury fibers and about twenty-eight percent, by weight, of luxury fibers and between about eighty-two percent, by weight, of non-luxury fibers and about ninety-eight percent, by weight, of non-luxury fibers. In various further aspects thereof, the non-luxury fibers may be polyester fibers; the luxury fibers may be silk fibers or cashmere fibers; the fiberfill may be comprised of loose fibers or a nonwoven batt; and the household textile article may be comprised of a pillow form or a quilt.

NOTATION AND NOMENCLATURE

Certain terms are used throughout the detailed description and claims that follow to refer to particular components of the various textile fiber products disclosed herein. As one skilled in the art will appreciate, different names are periodically used to refer to the same components. Accordingly, this document does not intend to distinguish between components that differ in name, but not in function.

Also, in the detailed description and claims which follow, the terms “including” and “comprising” are used in an open-ended fashion and thus should be interpreted to mean “including, but not limited to . . . ”.

The term “or” is used in an inclusive fashion and should be interpreted to mean “and/or.”

The terms “associated with” and “associated therewith”, as well as derivatives thereof, may mean “to include”, “be included within”, “interconnect with”, “contain”, “be contained within”, “connect to”, “connect with”, “couple to”, “couple with”, “be communicable with”, “cooperate with”, “interleave”, “juxtapose”, “be proximate to”, “be bound to”, “be bound with”, “have”, “have a property of”, or the like.

The term “textile fiber product” refers to: (1) any fiber, whether in the finished or unfinished state, used or intended for use in household textile articles; (2) any yarn or fabric, whether in the finished or unfinished state, used or intended for use in household textile articles; and (3) any household textile article made in whole or in part of yarn or fabric; except that such term does not refer to: (a) upholstery stuffing; or (b) outer coverings of furniture, mattresses and box springs.

The term “household textile articles” refers to articles of wearing apparel, costumes and accessories, draperies, floor coverings, furnishings, beddings, and other textile goods of a type customarily used in a household regardless of where used in fact but does not refer to upholstered furniture, mattresses and box springs.

The term “bedding” refers to sheets, covers, blankets, comforters, pillows, pillowcases, quilts, bedspreads, pads and all other textile fiber products used or intended to be used on or about a bed or other place for reclining or sleeping regardless of where used in fact but does not refer to mattresses or box springs.

The term “ticking” refers to an outermost layer of fabric or other material that encloses a fiber batt, loose fiberfill or other resilient material but shall not include tickings for mattresses or upholstered furniture.

The term “bond” or “bonded” refers to any type of fastening or adhesion between fibers or fiber batts, such as that achieved with glue, adhesives, resins or other bonding agents which can be sprayed, painted, or otherwise applied to the fibers or fiber batts. The term “bond” or “bonded” also refers to the adhesion between fibers achieved using thermal processing of fibers or fiber batts in which a low-melt binder fiber had been blended therewith. In addition, fibers or fiber batts may also be mechanically bonded to one another, for example, by needling, entanglement, frictional engagement, electrostatic attraction or the like. Finally, the term “bond” or “bonded” refers to the overlaying of fiber batts on one another, either with or without, subsequent bonding, laminating or thermal processing thereof.

Definitions for certain other words and phrases may be provided throughout this patent document. Those of ordinary skill in the art should understand that in many, if not most instances, such definitions apply to prior, as well as future uses of such defined words and phrases.

DETAILED DESCRIPTION

Disclosed herein are household textile articles filled with a luxury fiber blend and methods for producing a luxury fiber blend for use in fiberfill household textile articles. In accordance with the disclosed methods, luxury fibers and non-luxury fibers are blended into a homogeneous mixture of fibers. In one aspect, the luxury fiber blend is blown or otherwise forced into a ticking or other type of casing for a household textile article, for example, a pillow. The ticking is then sewn closed or otherwise sealed to trap the loose fibers within the ticking. In another, the luxury fiber blend is carded or garneted to form a nonwoven fiber batt suitable for insertion into the ticking or other type of casing for a pillow, quilt or other type of household textile article. Again, after insertion of the nonwoven fiber batt, the ticking may be sewn closed or otherwise sealed to secure the nonwoven fiber batt within the ticking. If desired, before insertion into the ticking or other type of casing, the nonwoven fiber batt may be bonded using either a thermal or resin bonding process.

As defined herein, a luxury fiber blend is comprised of a blend of a selected amount of a first type of fiber and a second amount of a second type of fiber. As will be more fully described below, the first type of fiber shall hereafter be referred to as a "luxury fiber" and the second type of fiber shall hereafter be referred to as either a non-luxury" or "ordinary" fiber. While the description which follows enumerates specific examples of known types of fibers which are specifically identified as either types of luxury fibers or types of non-luxury or ordinary fibers, it should be appreciated that all such enumerations are, by no means, considered to be exhaustive and that it fully contemplated that there may be any number of other types of fibers generally recognized in the art as being either luxury fibers or non-luxury fibers.

It should also be appreciated that the term "luxury" is oftentimes a relative term. Accordingly, even in those situations where one skilled in the art would not ordinarily recognize a first type of fiber as being a luxury fiber, as used herein, a first type of fiber may be characterized as a luxury fiber relative to a second type of fiber whenever the cost per unit weight of the first type of fiber significantly exceeds the cost per unit weight of the second type of fiber, for example, where the cost per unit weight of the first type of fiber exceeds the cost per unit weight of the second type of fiber by about $1.00 per pound or more.

As previously set forth, a luxury fiber blend is comprised of a selected amount of luxury fiber and a selected amount of non-luxury or ordinary fiber. It is contemplated that the luxury fiber blend may be comprised of various amounts and/or types of luxury and non-luxury or ordinary fibers. In one embodiment of the invention, it is contemplated that the luxury fiber blend be comprised of about five percent by weight of a luxury fiber, for example, silk or cashmere. In another, it is contemplated that the luxury fiber blend be comprised of about five percent by weight of a luxury fiber, for example, silk or cashmere and about 95 percent by weight of a non-luxury or ordinary fiber, for example, polyester. By producing a luxury fiber blend which includes about five percent by weight of a luxury fiber, a household textile article having a fiberfill composed of the luxury fiber blend may be labeled to indicate that the selected luxury fiber is a component of the household textile article. As a result, consumers will recognize the household textile article as a luxury item. Advantageously, however, by limiting the amount of luxury fiber included in the household textile article to about five percent, the resultant household textile article will also be very economically priced.

In another embodiment of the invention, it is contemplated that the luxury fiber blend be comprised of about two percent to about eight percent by weight of a luxury fiber, for example, silk or cashmere. In still another, it is contemplated that the luxury fiber blend be comprised of about two percent to about eight percent by weight of a luxury fiber, for example, silk or cashmere, and about 92 percent to about 98 percent by weight of a non-luxury or ordinary fiber, for example, polyester. By producing a luxury fiber blend which includes between about 2 and about 8 percent by weight of a luxury fiber, a household textile article having a fiberfill composed of the luxury fiber blend may be labeled to indicate that the selected luxury fiber is a component of the household textile article. In this case, however, the household textile article may be so labeled because the deviation of the percentage by weight of the selected luxury fiber from the requisite minimum percentage by weight to properly identify the selected luxury fiber as a component of the household textile article is within 3 percent by weight—the currently accepted reasonable tolerance for deviation. As a result, consumers will again recognize the household textile article as a luxury item. Advantageously, however, by limiting the amount of luxury fiber included in the household textile article between about 2 percent and about 8 percent, the resultant household textile article will again be very economically priced.

It should be recognized that, while consumers accord higher status to many of the luxury fibers than to non-luxury or ordinary fibers, in many cases, the characteristics of the so-called luxury fibers are similar, or, in some cases, inferior to the characteristics of non-luxury or ordinary fibers. For example, a pillow with a 100 percent luxury fiberfill may not be appreciably softer or plusher than a pillow with a 100 percent non-luxury or ordinary fiberfill. Accordingly, in another embodiment of the invention, it is contemplated that the luxury fiber blend be comprised of about five to about fifteen percent by weight of a luxury fiber, for example, silk or cashmere. In still another embodiment, it is contemplated that the luxury fiber blend be comprised of about five to about fifteen percent by weight of a luxury fiber, for example, silk or cashmere, and about eighty-five to about ninety-five percent by weight of a non-luxury or ordinary fiber, for example, polyester. As it is generally acknowledged that the characteristics of most fiber blends are not affected by a component of the blend until that component is at least fifteen percent by weight of the blend, by producing a luxury fiber blend which includes between about five and about fifteen percent by weight of a luxury fiber, a household textile article fiber having a fiberfill composed of the luxury fiber blend may be labeled to indicate that the selected luxury fiber is a component of the household textile article. As a result, consumers will again recognize the household textile article as a luxury item. Furthermore, because the selected luxury fiber is limited to between about five and about fifteen percent by weight of the luxury fiber blend, the characteristics of the household textile article will not be adversely affected by the inclusion of the selected luxury fiber in the luxury fiber blend. Finally, by limiting the amount of luxury fiber included in the household textile article to no more than about fifteen percent, the resultant household textile article will still be economically priced when compared to household textile articles composed of greater percentages of luxury fibers.

In another embodiment of the invention, again, one particularly relevant to those situations where the characteristics of the luxury fiber included in the luxury fiber blend are similar or inferior to the characteristics of the non-luxury or ordinary fiber included in the blend, it is contemplated that the luxury fiber blend be comprised of about two percent to about eighteen percent by weight of a luxury fiber, for example, silk or cashmere. In still another, it is contemplated that the luxury fiber blend may be comprised of about two percent to about eighteen percent by weight of a luxury fiber and about eighty-two percent to about ninety-eight percent by weight of a non-luxury or ordinary fiber, for example, polyester. By producing a luxury fiber blend which includes between about two and about eighteen percent by weight of a luxury fiber, a household textile article fiber having a fiberfill composed of the luxury fiber blend may be labeled to indicate that the selected luxury fiber is a component of the household textile article and, as a result, consumers will recognize the household textile article as a luxury item. Here, again, the household textile article may be so labeled because the deviation of the percentage by weight of the selected luxury fiber from the requisite minimum percentage by weight to properly identify the selected luxury fiber as a component of the household textile article is within three percent by weight—the currently accepted reasonable tolerance for deviation. Again, the amount of luxury fiber included in the household is advantageously limited to between about two percent and about eighteen percent by weight of the luxury fiber blend. As a result, the household textile article will continue to be very economically priced relative to household textile articles containing higher percentages by weight of the selected luxury fiber.

In another embodiment of the invention, it is contemplated that the luxury fiber blend be comprised of about five to about twenty-five percent by weight of a luxury fiber. In still another embodiment, it is contemplated that the luxury fiber blend be comprised of about five to about twenty-five percent by weight of the luxury fiber and about seventy-five to about ninety-five percent by weight of a non-luxury or ordinary fiber. As it is recognized that, for certain fiber blends, for example, blends which include wool fibers, a selected component fiber will not alter the appearance, texture or performance of the fiber blend until that component is at least twenty-five percent by weight of the fiber blend, by producing a luxury fiber blend which includes between about five and about twenty-five percent by weight of a luxury fiber, a household textile article fiber having a fiberfill composed of the luxury fiber blend may be labeled to indicate that the selected luxury fiber is a component of the household textile article. As a result, consumers will again recognize the household textile article as a luxury item. Furthermore, because the selected luxury fiber is limited to between about five and about twenty-five percent by weight of the luxury fiber blend, the characteristics of the household textile article will not be adversely affected by the inclusion of the selected luxury fiber in the luxury fiber blend. Finally, by limiting the amount of luxury fiber included in the household textile article to no more than about twenty-five percent, the resultant household textile article will still be economically priced when compared to household textile articles composed of greater percentages of luxury fibers.

In another embodiment of the invention, again one particularly relevant where the characteristics of the luxury fiber included in the luxury fiber blend are similar or inferior to the characteristics of the non-luxury or ordinary fiber included in the blend and where the characteristics of the fiber blend are not affected by the component fiber until the component fiber is at least twenty-five percent by weight of the fiber blend, it is contemplated that the luxury fiber blend be comprised of between about two percent and about twenty-eight percent by weight of a luxury fiber. In still another embodiment, it is contemplated that the luxury fiber blend be comprised of between about two percent and about twenty-eight percent by weight of the luxury fiber and between about seventy-two percent and about ninety-eight percent by weight of a non-luxury or ordinary fiber. By producing a luxury fiber blend which includes between about two and about twenty-eight percent by weight of a luxury fiber, a household textile article fiber having a fiberfill composed of the luxury fiber blend may be labeled to indicate that the selected luxury fiber is a component of the household textile article and, as a result, consumers will recognize the household textile article as a luxury item. Yet again, the household textile article may be so labeled because the deviation of the percentage by weight of the selected luxury fiber from the requisite minimum percentage by weight to properly identify the selected luxury fiber as a component of the household textile article is within three percent by weight-the currently accepted reasonable tolerance for deviation. Again, the amount of luxury fiber included in the household is advantageously limited to between about two percent and about twenty-eight percent by weight of the luxury fiber blend. As a result, the household textile article will continue to be economically priced relative to household textile articles containing higher percentages by weight of the selected luxury fiber.

In another embodiment of the invention, a fiber blend is comprised of at least about two percent (or, in one aspect thereof, at least about five percent), by weight, of a first type of fiber and an equal or greater amount of a second type of fiber. In further accordance with this embodiment of the invention, the cost per unit weight of the second type of fiber is less than the cost per unit weight of the first type of fiber. By producing a fiber blend which includes at least two percent (or at least five percent), by weight, of the first type of fiber, a household textile article fiber having a fiberfill comprised of the fiber blend may be labeled to indicate that the first type of fiber is a component of the household textile article. Of course, for those aspects of this embodiment containing between two and five percent, by weight, of the first type of fiber, the household textile article may be so labeled only because the deviation of the percentage by weight of the first type of fiber from the requisite minimum percentage by weight to properly identify the first type of fiber as a component of the household textile article is within three percent by weight-the currently accepted reasonable tolerance for deviation. Further, by configuring the composition of the fiber blend such that the amount, by weight, of the second, less expensive, type of fiber always exceeds the amount, by weight, of the first, more expensive, type of fiber, the resultant household textile article will be economically priced relative to household textile articles containing higher percentages by weight of the first type of fiber. Thus, the household textile article will be generally recognized by consumers as containing the first type of fiber but will be less expensive relative to those household textile articles containing larger amounts of the first type of fiber.

Figure 2:
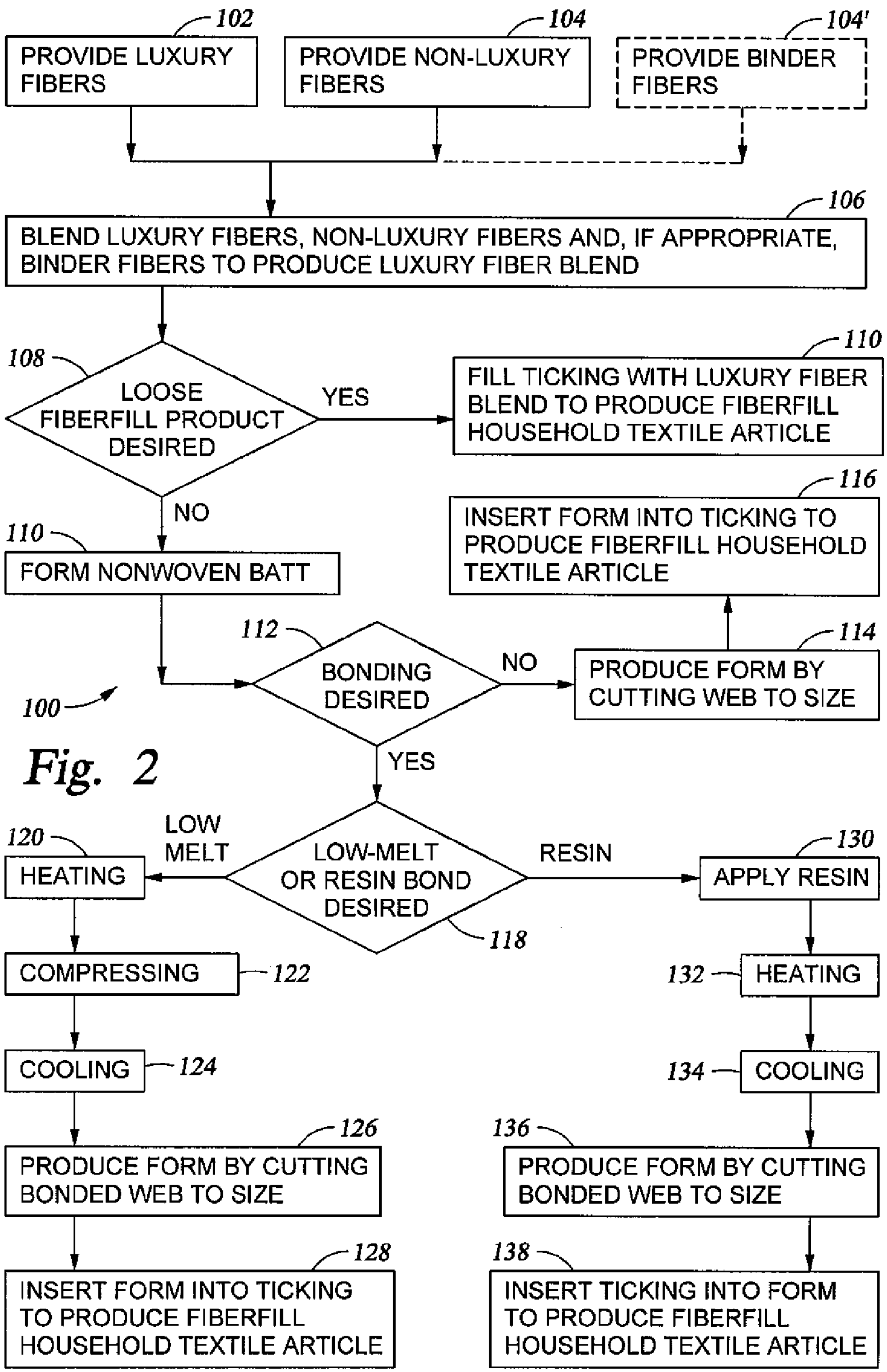
FIG. 2 is a flowchart of a method of constructing a luxury fiberfill household textile article in accordance with the teachings of the present invention.

Referring now, in combination, to FIGS. 1 and 2, processing line 10, which forms the luxury fiber blends, webs and/or nonwoven fiber batts used as fiberfill for household textile articles, and method 100 of constructing fiberfill household textile articles in accordance with the teachings of the present invention will now be described in greater detail. It should be noted that, in the description which follows, a single processing line, specifically, the processing line 10, is used to produce: (a) a luxury fiber blend which is removed from the processing line 10 for use as fiberfill without being carded or garneted into a fiber batt; (b) an unbonded, nonwoven fiber batt formed from the luxury fiber blend; and (c) a bonded, nonwoven fiber batt, again formed from the luxury fiber blend. It should be noted, however, that it may be inconvenient or impractical to use the same processing line to form the three discrete processes. Accordingly, while, for ease of illustration and description, the present application shows all three fiberfill products being formed from a common processing line, it is fully contemplated that the fiberfill products may, in fact, be formed at separate processing lines.

In accordance with the method 100 of FIG. 2, a specified amount of luxury fibers is provided at step 102, a specified amount of non-luxury or ordinary fibers are provided at step 102 and, at step 106, the provided luxury fibers are blended with the provided non-luxury or ordinary fibers to produce a homogeneous luxury fiber blend. Variously, the provided luxury fiber may be any of the various types of fibers generally recognized in the art as a type of luxury fiber. For example, silk, cashmere, wool, alpaca, merino, pashmina, cashgora, mohair, camel, and angora are all generally recognized in the art as different types of luxury fiber. Of course, the foregoing list is, by no means, exhaustive and it is fully contemplated that persons of ordinary skill in the art would be aware of fibers generally recognized as luxury fibers other than those specifically enumerated herein. If desired, rather than being composed entirely of one type of luxury fiber, the provided luxury fiber may itself be comprised of a blend of plural types of these or other luxury fibers. Of course, it should be recognized that, if the provided luxury fiber is a blend of plural types of luxury fibers, certain benefits of the invention may not necessarily be available, particularly when one or more of the plural types of luxury fibers is provided in an amount less than five percent, by weight, of the fiber blend.

In various embodiments of the invention, the non-luxury or ordinary fibers may be natural or synthetic fibers. For example, synthetic fibers suitable for use as the non-luxury or ordinary fibers include thermoplastic polymer fibers such as polyester fibers. Again, it should be readily appreciated that, depending upon limitations imposed on the manufacturing process and/or desired characteristics of the fiberfill resulting from the manufacturing process, other non-luxury or ordinary fibers may be suitable for use in place of the polyester fibers. For purposes of illustrating the invention and not by way of limitation, one suitable synthetic polyester fiber suitable for selection as the non-luxury or ordinary fiber is the Type 209 polyester fiber, a staple fiber which is manufactured by KoSa. Another synthetic polyester fiber suitable for selection as the non-luxury or ordinary fiber is the Type 295 polyester fiber, another staple fiber manufactured by KoSa. Again, if desired, the provided non-luxury or ordinary fiber may be comprised of a blend of plural types of these or other non-luxury or ordinary fibers.

The selected amount of one or more types of luxury fibers and the selected amount of one or more types of non-luxury or ordinary fibers are blended together using fiber blender 12. If desired, the homogeneous luxury fiber blend may be used in the loose fiber form. In other words, the luxury fiber blend may be used as a fiberfill without being garneted into a batt. Accordingly, after using the fiber blender 12 to form a luxury fiber blend from the selected amount of at least one type of luxury fiber and the selected amount of at least one type of non-luxury or ordinary fibers at step 106, the method proceeds to step 108 where it is determined if the luxury fiber blend is to be used as loose fiberfill in the fiberfill household textile article under construction. If so, the method proceeds to step 110 where construction of a fiberfill household textile article is completed by filling a ticking or other type of casing for the fiberfill household textile article with the luxury fiber blend, for example, by blowing loose luxury fiber blend removed from the fiber blender 12 into the ticking until the ticking is filled with the luxury fiber blend.

Returning to step 108, if a loose fiber fill product is not desired, the method will instead proceed to step 110 where a web formed using the luxury fiber blend is constructed. To do so, the luxury fiber blend produced by the fiber blender 12 is conveyed by conveyor pipes 14 to a web-forming machine or, in this example, three machines 16, 17, and 18. A suitable web forming apparatus is a garnett machine. An air-lay machine, such as the air lay machine known in the trade as a Rando webber, or any other suitable apparatus can also be used to form a web structure. Garnett machines 16, 17, and 18 card the blended fibers into a nonwoven web having a desired width and deliver the web to cross-lappers 16', 17', and 18' to cross-lap the web onto a slat conveyor 20 which is moving in the machine direction. Cross-lappers 16', 17', and 18' reciprocate back and forth in the cross direction from one side of the slat conveyor 20 to the other side to form a nonwoven fiber batt having multiple thicknesses in a progressive overlapping relationship. Of course, while FIG. 1 shows the machine direction for the slat conveyor 20 as being generally orthogonal to the cross direction of the cross lappers 16', 17', and 18', it should be clearly understood that the process line 10 is but one suitable process line capable of performing the desired operations. In this regard, it is specifically noted that there are any number of other process lines equally suitable for the purposes contemplated herein. For example, it is contemplated that a process line in which the machine direction of the slat conveyer is generally aligned with the batt forming machinery would be equally suitable for the purposes contemplated herein.

The number of layers which make up the nonwoven fiber batt is determined by the speed of the conveyor 20 in relation to the speed at which successive layers of the nonwoven fiber batt are layered on top of each other and the number of cross-lappers 16', 17', and 18'. Thus, the number of single layers that make up the nonwoven fiber batt can be increased by slowing the relative speed of the conveyor 20 in relation to the speed at which cross layers are layered, by increasing the number of cross-lappers 16', 17', and 18', or both. Conversely, a fewer number of single layers can be achieved by increasing the relative speed of conveyor 20 to the speed of laying the cross layers, by decreasing the number of cross-lappers 16', 17', and 18', or both.

After forming a nonwoven fiber batt comprised of the luxury fiber blend at step 110, the method proceeds to step 112 where it is determined if the nonwoven fiber batt should be bonded before used as fiberfill for the household textile article. If bonding is not required, the method proceeds to step 112 where the nonwoven fiber batt comprised of the luxury fiber blend is removed from the conveyer 20. The method then proceeds to step 114 where one or more forms, each suitably sized to fit within the ticking or other type of casing of one of the fiberfill household article being constructed, are produced by cutting the nonwoven fiber batt comprised of the luxury fiber blend to the appropriate dimensions. Depending on the original dimensions of the web from which the forms are produced, the nonwoven fiber batt may require cutting in the lateral dimension, the transverse dimension or both. After producing one or more forms, each consisting of a section of the nonwoven fiber batt comprised of the luxury fiber blend, the method proceeds to step 116 where each of the produced forms is inserted into a corresponding one of the tickings or other types of casings to produce a household textile article having a fiberfill consisting of a section of the nonwoven fiber batt comprised of the luxury fiber blend.

Returning to step 112, if a bonded fiber batt is desired, the method proceeds to step 118 for selection between a thermal (or "low-melt") type bonded fiber batt or a resin bonded fiber batt. If thermal bonding is desired, the process described herein must have previously been modified by the inclusion of step 104' (shown in phantom in FIG. 1). In step 104', a selected amount of binder fiber is provided. In addition, step 106 must have previously been modified such that luxury fiber blend produced thereby is comprised of luxury fibers, non-luxury fibers and binder fibers. The binder fibers, which may either be natural or synthetic fibers, have a relatively low predetermined melting temperature as compared with the luxury and non-luxury carrier fiber. As used herein, however, the term melting does not necessarily refer only to the actual transformation of the solid binder fibers into liquid form. Rather, it refers to a gradual transformation of the binder fibers or, in the case of bicomponent sheath/core binder fibers, the sheaths of the fibers, over a range of temperatures within which the binder fibers becomes sufficiently soft and tacky to cling to other fibers that it comes in contact, including other binder fibers, luxury fibers and non-luxury fibers. For purposes of illustrating the process and luxury fiber blend and not by way of limitation, it is contemplated that, in one embodiment, the binder fiber is Type 254 Celbond fiber manufactured by KoSa. The Type 254 fiber is a bicomponent fiber with a polyester core and a copolyester sheath. The sheath component melting temperature is approximately 230° F. (110° C.). The binder fiber, alternatively, can be a polyester copolymer rather than a bicomponent fiber.

If it is determined at step 118 that the nonwoven fiber batt is to be thermally bonded, the method proceeds, in sequence, through steps 120, 122 and 124, in which the nonwoven fiber batt is heated, compressed, and cooled, respectively. The foregoing process steps are performed by bonding station 30. While there are a variety of thermal bonding methods which are suitable for the present invention, one such method which may be performed by the heating station 30 is to hold the nonwoven fiber batt by vacuum pressure applied through perforations of first and second counter-rotating drums 40 and 50. The nonwoven fiber batt is then heated so that the relatively low melting temperature binder fibers soften or melt to the extent necessary to fuse the low melt binder fibers together and to the luxury and non-luxury fibers therein.

As the fiber batt exits the bonding station 30, the nonwoven fiber batt is compressed and cooled as by a first perforated or wire mesh apron 70 and a second perforated or wire mesh apron (not visible in FIG. 1) substantially parallel to the first apron 70. The aprons are mounted for parallel movement relative to each other to facilitate adjustment for a wide range of thicknesses for the nonwoven fiber batt. The nonwoven fiber batt can be cooled slowly through exposure to ambient temperature air or, alternatively, ambient temperature air can forced through the perforations of one apron, through the nonwoven fiber batt and through the perforations of the other apron to cool the nonwoven fiber batt and set it in its compressed state. The nonwoven fiber batt is maintained in its compressed form upon cooling since the solidification of the low melt temperature binder fibers in their compressed state bonds the luxury, non-luxury and binder fibers together in that state.

After cooling in its compressed form, the method proceeds to step 126 where one or more forms, each suitably sized to fit within the ticking or other type of casing of one of the fiberfill household article being constructed, are produced by transporting the nonwoven fiber batt to cutting station 80 for cutting of the nonwoven fiber batt. Depending on the original dimensions of the nonwoven fiber batt from which the forms are produced, the nonwoven fiber batt may require cutting in the lateral dimension, the transverse dimension or both. After producing one or more forms, each consisting of a section of the nonwoven fiber batt comprised of the luxury fiber blend, the method proceeds to step 128 where each of the produced forms is inserted into a corresponding one of the tickings or other types of casings to produce a household textile article having a fiberfill consisting of a section of the nonwoven fiber batt comprised of the luxury fiber blend.

Returning to step 118, it is determined that the nonwoven fiber batt is to be bonded using a resin bonding process, the method will instead proceed through to step 130, below. Of course, in a resin bonding process, certain of the processing steps previously set forth would also need to be modified somewhat. More specifically, the web and nonwoven fiber batt forming steps for the resin bonding method are generally similar to those for the thermal bonding process set forth above. However, an air-laying machine may be used instead. Generally, the fibers are introduced into an air stream that carries the fibers to an air permeable support such as a perforated drum that is rotating. Accumulation of the fibers onto the drum surface results in a web formation. A vacuum is applied through the web from one side of the web to the other and through the air permeable support sufficient to reduce the thickness and increase the density of the web throughout the thickness of the web to form a nonwoven fiber batt.

At step 130, heat curable resin is applied to the nonwoven batt for bonding the fibers. While there are a variety of applications, generally resin in the form of liquid is sprayed while froth resin is extruded onto the nonwoven fiber batt. Alternatively, the nonwoven fiber batt is fed or dipped into a bath of resin. Resins suitable for the present invention are curable by heat and can be any of a variety of compositions. Generally, the resin is comprised of latex or acrylic binders. In the application of liquid resin, as the nonwoven fiber batt moves along a conveyor in the machine direction, the resin is sprayed onto the nonwoven fiber batt from one or more spray heads that move in a transverse or cross direction to substantially coat the nonwoven fiber batt. Froth resin is extruded onto the nonwoven fiber batt using a knife or other means. The nonwoven fiber batt could also be fed through or dipped into a resin bath. The applied resin is crushed into the nonwoven fiber batt for saturation therethrough by nip rollers that are disposed along the transverse direction of the conveyor to apply pressure to the surface of the nonwoven fiber batt. Alternatively, the resin is crushed into the batt by vacuum pressure applied through the nonwoven fiber batt.

Proceeding on to step 132, the nonwoven fiber batt moves into an oven heated to a temperature capable of curing the resin. The nonwoven fiber batt exits the oven and, continuing on to step 134, is cooled. The nonwoven fiber batt is maintained substantially in its oven state upon cooling since the heat cures the resin that bonds the fibers of the nonwoven fiber batt together in this state. After cooling in this state, the method proceeds to step 136 where one or more forms, each suitably sized to fit within the ticking or other type of casing of one of the fiberfill household article being constructed, are produced by transporting the nonwoven fiber batt to a cutting zone for cutting of the nonwoven fiber batt. Depending on the original dimensions of the nonwoven fiber batt from which the forms are being produced, the nonwoven fiber batt may require cutting in the lateral dimension, the transverse dimension or both. After producing one or more forms, each consisting of a section of the nonwoven fiber batt comprised of the luxury fiber blend, the method proceeds to step 138 where each of the produced forms is inserted into a corresponding one of the tickings or other types of casings to produce a household textile article having a fiberfill consisting of a section of the nonwoven fiber batt comprised of the luxury fiber blend.

Figure 3A:
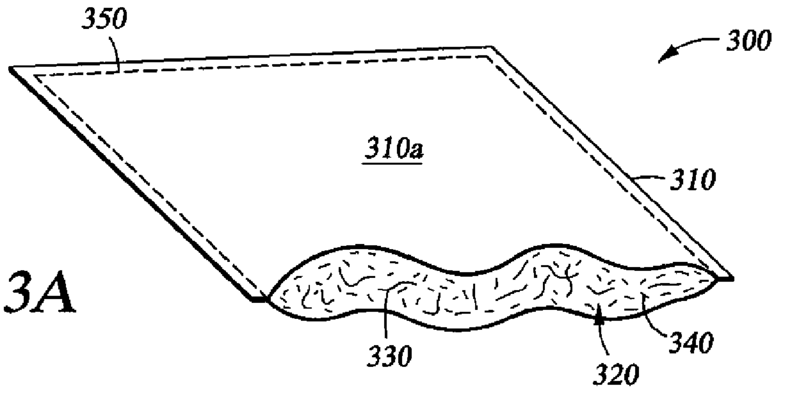
FIG. 3A is a perspective cross-sectional view of a first luxury fiberfill household textile article constructed in accordance with the methods of FIG. 2.

Referring next to FIG. 3A, a perspective cross-sectional view of a first household textile article 300, more specifically, a pillow, filled with the luxury fiber blend hereinabove set forth, will now be described in greater detail. As may now be seen, the pillow 300 comprises a ticking 310 and fiberfill 320. The ticking 310 may be any woven or non-woven textile. Typically, the ticking 310 is formed by aligning two sections of a selected textile material along their respective edges and securing the textile sections to one another, for example, by stitching the textile sections together using thread 350. By securing the textile sections together in this manner, the resultant ticking 310 defines an interior volume. Of course, a portion of the textile sections are typically left unsecured until after the interior volume is filled with the fiberfill 320.

If desired, the ticking may have ornamentation (not shown), either by imprinting an outer side surface 310*a* of the ticking 310 with a design or by forming a visibly discernable pattern or design using the yarn or fibers from which the ticking 310 was constructed. The fiberfill 320 is comprised of the luxury fiber blend hereinabove described which, as previously set forth, is a homogeneous blend of luxury fibers 330, for example, silk or cashmere, and non-luxury or ordinary fibers 340, for example, polyester fibers. As disclosed herein, the fiberfill 320 is comprised of loose luxury and non-luxury fibers and formed by blowing or otherwise forcing a sufficient amount of the luxury fiber blend into the interior volume of the ticking 310. For example, the unsecured edges of the textile sections defining the ticking 310 may be secured to a blower which subsequently forces the luxury fiber blend into the interior volume of the ticking 310 until filled. The unsecured edges of the textile sections are then be secured to one another to complete assembly of the pillow 300. By filling the pillow 300 with loose fibers in the manner described herein, the luxury fiber blend is able to fill the corners of the pillow 300, thereby giving the pillow 300 a more consistent fill than often available when webs or batts are used.

Figure 3B:
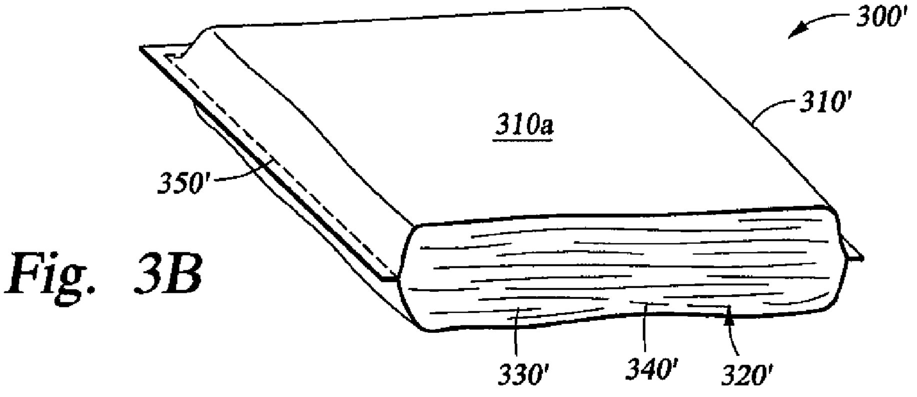
FIG. 3B is a perspective cross-sectional view of a second luxury fiberfill household textile article constructed in accordance with the methods of FIG. 2.

Referring next to FIG. 3B, a perspective cross-sectional view of a second household textile article 300', here, a pillow form, filled with the luxury fiber blend hereinabove set forth, will now be described in greater detail. In this regard, it should be noted that a pillow form, for example, the pillow form 300' differs from a pillow, for example, the pillow 300, in that the typically plain white ticking of a pillow form is usually covered by a second, decorative, ticking before the pillow form is used, for example, as a throw pillow for a sofa, chair or other article of furniture. As may know be seen, the pillow form 300' comprises a ticking 310', typically formed using plain white cloth, and fiberfill 320'. Here, however, the fiberfill 320' is comprised of a nonwoven fiber batt, composed of luxury fibers 330' and non-luxury fibers 340' and produced by garneting or carding the luxury fiber blend in the manner hereinabove described, which is inserted into the ticking 310'. For example, the unsecured edges of the textile sections defining the ticking 310' are held apart and the nonwoven fiber batt forced into the interior volume of the ticking 310'. The unsecured edges of the textile sections are then be secured to one another by thread 350' to complete assembly of the pillow insert 300'. By having the fiberfill 320' be comprised of a nonwoven fiber batt, a small amount of mechanical integrity is imparted to the luxury fiber blend. As a result, when a nonwoven fiber batt formed of the luxury fiber blend is used in a pillow insert or other household textile article, the pillow is more apt to retain a specific shape.

It should be noted that the present disclosure of the pillow 300 as include the fiberfill 310 comprised of loose fibers and the pillow insert 300' as including the fiberfill 310' comprised of a nonwoven fiber batt should not be construed as a suggestion that one type of fiberfill is recommended for use with pillows and another type of fiberfill is recommended for use with pillow inserts. Rather, it is fully contemplated that fiberfills comprised of nonwoven fiber batts are equally suitable for use with pillows while fiberfills comprised of loose fibers are equally suitable for use with pillow inserts.

Figure 4:
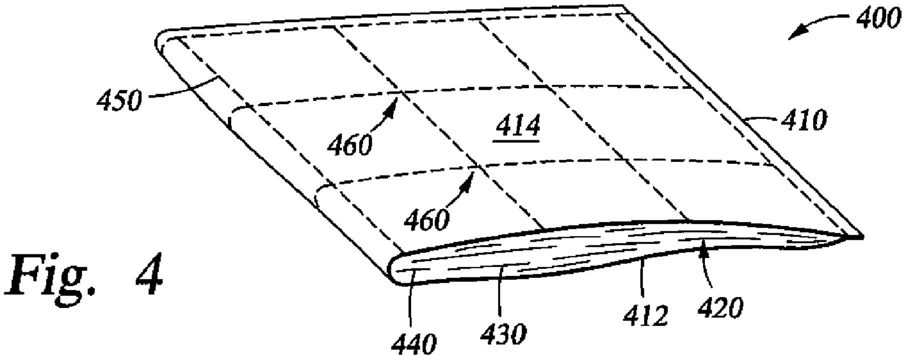
FIG. 4 is a perspective cross-sectional view of a third luxury fiberfill household textile article constructed in accordance with the methods of FIG. 2.

Referring next to FIG. 4, a perspective cross-sectional view of a third household textile article 400, here, a quilt, filled with the luxury fiber blend hereinabove set forth, will now be described in greater detail. The quilt 400 comprises a ticking 410 and fiberfill 420. As before, the ticking 410 is comprised of a first textile section 412 and a second textile section 414. Here, however, the first and second textile sections 412 and 414 are not secured to one until the fiberfill 420 is positioned therebetween. The fiberfill 420 is comprised of a nonwoven fiber batt composed of luxury fibers 430 and non-luxury fibers 440 and produced by garneting or carding the luxury fiber blend in the manner hereinabove described. To construct the quilt 400, the fiberfill 420 is first laid onto the first textile section 412. The second textile section 414 is then laid onto the fiberfill 420. A plurality of tack points 460, which extend through the fiberfill 420, are then used to secure the first and second textile sections 412 and 414 to one another. Typically, the tack points 460 may be constructed in a manner similar to that previously described with respect to FIG. 3A as to how the stitching 350 was used around the perimeter of the ticking 310 to secure, to one another, the aligned edges of the textile sections from which the ticking 310 was formed.

Thus, there has been described and illustrated herein, a luxury fiber blend suitable for use as fiberfill for household textile articles such as pillows, quilts, other beddings and the like. Also described herein have been a wide variety of formulations of the disclosed luxury fiber blend and a number of ways in which disclosed luxury fiber blend is configured for use as fiberfill. Those skilled in the art should recognize that the embodiments of the invention disclosed herein are purely illustrative and that numerous modifications and variations thereof may be made while remaining within the spirit and scope of the present invention. Accordingly, the scope of protection sought herein is as set forth in the claims below.

What is claimed is:

1. A fiber blend for use in fiberfill household textile articles, said fiber blend comprising:

a first amount, by weight, of a first type of fiber, said first type of fiber having a first cost per unit weight; and a second amount, by weight, of a second type of fiber, said second type of fiber being a staple fiber having a second cost per unit weight;

wherein said first amount of said first type of fiber is at least about two percent and at most about twenty-eight percent, by weight, of said fiber blend and said second amount, by weight, of said second type of fiber is equal to or greater than said first amount of said first type of fiber; and wherein said cost per unit weight of said second type of fiber is substantially less than said cost per unit weight of said first type of fiber.

2. The fiber blend of claim 1, wherein said first type of fiber is a luxury fiber and said second type of fiber is a non-luxury fiber.

3. The fiber blend of claim 1, wherein said first type of fiber is silk and said second type of fiber is polyester.

4. The fiber blend of claim 1, wherein said first type of fiber is cashmere and said second type of fiber is polyester.

5. The fiber blend of claim 1, wherein said first amount of said first type of fiber is between about two percent and about eight percent, by weight, of said fiber blend.

6. The fiber blend of claim 5, wherein said first type of fiber is a luxury fiber and said second type of fiber is a non-luxury fiber.

7. The fiber blend of claim 5, wherein said first type of fiber is silk and said second type of fiber is polyester.

8. The fiber blend of claim 7, wherein said second amount of said second type of fiber is about ninety-five percent, by weight, of said fiber blend.

9. The fiber blend of claim 5, wherein said first type of fiber is cashmere and said second type of fiber is polyester.

10. The fiber blend of claim 9, wherein said second amount of said second type of fiber is about ninety-five percent, by weight of said fiber blend.

* * * * *